(12) United States Patent
Peacock et al.

(10) Patent No.: US 9,325,734 B1
(45) Date of Patent: *Apr. 26, 2016

(54) DISTRIBUTED POLYMORPHIC TRANSFORMATION OF SERVED CONTENT

(71) Applicant: Shape Security, Inc., Palo Alto, CA (US)

(72) Inventors: Timothy Dylan Peacock, San Francisco, CA (US); Justin D. Call, Santa Clara, CA (US); Siying Yang, Cupertino, CA (US); Sumit Agarwal, Palo Alto, CA (US)

(73) Assignee: Shape Security, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,632

(22) Filed: Dec. 15, 2014

Related U.S. Application Data

(63) Continuation-in-part of application No. 14/503,346, filed on Sep. 30, 2014.

(51) Int. Cl.
*G06F 7/04* (2006.01)
*H04L 29/06* (2006.01)

(52) U.S. Cl.
CPC ........ *H04L 63/1441* (2013.01); *H04L 63/1483* (2013.01)

(58) Field of Classification Search
CPC ........................ H04L 63/1441; H04L 63/1483
USPC ........................................................... 726/8
See application file for complete search history.

(56) References Cited

U.S. PATENT DOCUMENTS

| | | | |
|---|---|---|---|
| 8,170,020 | B2 | 5/2012 | Oliver et al. |
| 2002/0083343 | A1* | 6/2002 | Crosbie et al. ................. 713/201 |
| 2004/0162994 | A1 | 8/2004 | Cohen et al. |
| 2006/0154261 | A1* | 7/2006 | Saxon et al. ....................... 435/6 |
| 2006/0174323 | A1* | 8/2006 | Brown et al. ....................... 726/3 |
| 2008/0222736 | A1 | 9/2008 | Boodaei et al. |
| 2009/0077383 | A1* | 3/2009 | de Monseignat et al. ..... 713/175 |
| 2009/0193513 | A1 | 7/2009 | Agarwal et al. |
| 2009/0282062 | A1 | 11/2009 | Husic |
| 2010/0100927 | A1 | 4/2010 | Bhola et al. |
| 2010/0257354 | A1 | 10/2010 | Johnston et al. |
| 2010/0262780 | A1 | 10/2010 | Mahan et al. |
| 2011/0055925 | A1* | 3/2011 | Jakobsson ....................... 726/25 |
| 2011/0178973 | A1 | 7/2011 | Lopez et al. |
| 2011/0296391 | A1 | 12/2011 | Gass et al. |
| 2011/0314297 | A1* | 12/2011 | Jakobsson ..................... 713/189 |
| 2013/0091582 | A1 | 4/2013 | Chen et al. |

FOREIGN PATENT DOCUMENTS

WO      WO 2013/091709      6/2013

* cited by examiner

*Primary Examiner* — Teshome Hailu
(74) *Attorney, Agent, or Firm* — Fish & Richardson P.C.

(57) ABSTRACT

A computer-implemented method includes receiving, at a computer security server system located between the Internet and a client computing device that makes requests over the Internet, a request for content directed to a particular content server system; forwarding the received request, with the computer security server system, to the particular content server system; receiving code from the particular server system in response to the request; applying a security countermeasure to the received code to created transformed code; providing the transformed code to the client computing device; receiving a communication from the client computing device; and determining that software on the client computing device has attempted to interact with the received code rather than the transformed code.

18 Claims, 6 Drawing Sheets

DISTRIBUTED POLYMORPHIC TRANSFORMATION OF SERVED CONTENT

CROSS-REFERENCE TO RELATED APPLICATIONS

This application is a continuation-in-part of and claims priority to U.S. application Ser. No. 14/503,346, filed Sep. 30, 2014, the entire contents of which are incorporated herein by reference.

TECHNICAL FIELD

This document relates to systems and techniques for identifying and interfering with the operation of computer malware, as a mechanism to improving computer system security.

BACKGROUND

Computer malware in the form of bots and other malicious software and hardware is a serious problem for commercial and non-commercial organizations that have a presence on the World Wide Web. For example, malicious parties may develop software that surreptitiously installs itself on the computers of unsuspecting user and monitors their interaction with their computers to improper ends. For example, malware that performs a so-called "Man in the Middle" or "Man in the Browser" attack may be installed on a user's computer, may monitor the user's actions, and may make itself seem to the user as if it is legitimate software, such as code downloaded to a browser by the user's bank. Such malware can then present a mock log in page to cause the user to supply his or her credentials (e.g., account number and password), and may then use those intercepted credentials to route money out of the user's account and into the fraudster's account.

SUMMARY

This document describes systems and techniques by which web code (e.g., HTML, CSS, and JavaScript) is modified by intermediate systems located between a Web server system (or other type of server system) that original serves content, and the client that has requested the content. The intermediate system may be located at a variety of locations along the path of the served content, including adjacent to the content server system and adjacent a requesting client, or at the "top" of a network serving the client or the server. Each such intermediate system may re-code the served content as it is served downward, so that the content is harder to exploit by malware at a client or at some intermediate point between the server and the client. Each intermediate system may cause responses from the client to be "worded" in terms of re-coded descriptors that would confuse an upstream system, and thus each intermediate system may also re-code (reverse transcode) such client requests in a manner that is inverse to that of the re-coding that it performed during the serving of the code. In this manner, the re-coding at lower levels will provide additional security for the upper levels, but will be invisible to the upper systems so that the upper systems do not have to take active steps to deal with it. The devices or services for performing such re-coding may be placed at arbitrary locations in the overall network, and may appear at multiple positions along the path of content that is being served, so that, in effect, the devices can be vertically "stacked," whether they coordinate or not, and even whether one device even needs to know that another device in the path exists.

One manner in which the content can be re-coded, or transcoded, is by identifying portions of the content that do not affect the manner in which the content is presented to and interacts with a user, such as names of functions and other objects that are not displayed. Such names can be transcoded into essentially random strings, and will not "break" the code as long as they are translated consistently—e.g., so that if the name of a function is changed, all calls to the function are changed in the same manner so that all the pieces of code still fit together. A variety of other transcodings may also be applied across the content (and across the various files in the content in a consistent manner). Then, to the extent a request that comes back from the client includes one of the transcoded names, the relevant intermediate system may transcode it back into the name it had when the content was served down to the intermediate system. The manner in which the names or other elements are transcoded may be different for each serving of the content (the content may be served polymorphically), so that malware cannot readily learn how the transcoding is occurring—i.e., the transcoding creates a moving target for the malware.

As noted, the transcoding described here can be layered, in that a particular piece of content may be transcoded multiple times at multiple locations along its path from an originating server system to a consuming client. In appropriate circumstances, such layering can occur without explicit coordination between the layers. In particular, an operator of a Web server system may perform transcoding that introduces random strings for object names and may serve the code across the Internet. A system operated by an ISP for its customers, by a corporation for its employees, or by a single at-home router serving a single home (e.g., by a company that provides broad-based broadband services) can further transcode the content based on its own analysis—including by changing the particular object name from a first random string of characters it receives to a second random string of characters that it creates. The second layer of transcoding can use the same algorithms, and even the same model of hardware, as earlier transcoding, and if the reverse communications are reverse transcoded, the various levels can avoid coordinating with each other in order to carry out the transcoding (though they may interoperate for other purposes, such as for sharing information about detected malware). The second, downstream transcoding system may use its own analysis to determine that other elements should be transcoded, or may transcode some of the same elements as the upstream system, and some elements that differ from those transcoded by the upstream system. As described below in more detail, the transcoding system may know about each other and may communicate to coordinate both their transcoding and their detection of malware-infected systems, even though the actual transcoding of any particular collection of content can be performed without any coordination.

The sub-systems at each layer may use the results of their actions in similar or in different manners as compared to each other, and with respect to detection of anomalous activity by client devices. For example, higher-level systems may seek to detect malware as a means for aggregating data about such detection across many detection events, so as to form a large database of knowledge about how malware is currently operating in an ecosystem of devices. In contrast, lower-level systems, such as systems operated by a corporation for its employees, may be more interested in detecting and explicitly identifying particular infected client devices, so that personnel may be deployed to eradicate any malware infections. The detection may occur, such as by a device recognizing function calls being made to names that should no longer exist given the transcoding performed on the code (which indicates that the malware is targeting "stale" code that has not been transcoded). That detection may occur by instrumentation code that was added to the content by the security server system, and that is programmed to execute on the client to device to observe how the content is acting, and how code on the device is interacting with the content and the computer and operating system.

In one implementation, a computer-implemented method includes receiving, at a computer security server system located between the Internet and a client computing device that makes requests over the Internet, a request for content directed to a particular content server system. The received request can be forwarded by the computer security server system to the particular content server system, and code can be received from the particular server system in response to the request. A security countermeasure can be applied to the received code to create transformed code, and the transformed code can be provided to the client computing device. A communication can be received from the client computing device, and a determination can be made that software on the client computing device has attempted to interact with the received code rather than the transformed code.

The details of one or more embodiments are set forth in the accompanying drawings and the description below. Other features and advantages will be apparent from the description and drawings, and from the claims.

This and other implementations can optionally include one or more of the following features.

The received code can be provided in response to a plurality of different requests for content, wherein transformed code transformed code provided for each particular one of the different requests differs from the transformed code provided for each other one of the different requests.

In response to determining that software on the client computing device has attempted to interact with the received code rather than the transformed code, an alert notification can be generated to personnel who correspond to the computer security server system.

The computer security server system can have coverage within a corporate local area network.

The computer security server system can be operated by a commercial Internet Service Provider (ISP) in serving content to subscribers of the commercial ISP.

Information about the client computing device can be reported from the ISP to a central security provider.

The code received from the particular content server system can previously have had countermeasures applied to it, by a security system located between the particular content server system and the Internet, that have transformed latent portions of the content that are not visible to a user of the client computing device using techniques that match countermeasures applied by the computer security server system.

The countermeasures can include applying polymorphic re-coding of the content, wherein the re-coding can differ for each of multiple different servings of the content.

In one implementation, a computer-implemented system can include a first electronic interface, a second electronic interface, a content transcoder, and a client monitor subsystem. The first electronic interface can be arranged to communicate with a plurality of client computing devices through a private network. The second electronic interface can be arranged to communicate with remote server systems through the Internet. The content transcoder can be arranged to apply one or more security countermeasures to code served from the remote server systems to the plurality of client computing devices. The client monitor subsystem can be arranged to receive reports from instrumentation code executing on the client computing devices and added by the content transcoder to the code served by the remote server systems, and to generate notifications when the instrumentation code indicates anomalous activity on one of the client computing devices.

This and other implementations can optionally include one or more of the following features.

The system can be arranged to provide the notifications to an information technology administrator, the notifications indicating particular ones of the client computing devices that are exhibiting anomalous behavior.

The notification can be provided in response to determining that software on a particular client computing device has attempted to interact with code received from one of the remote server systems rather than code created by the content transcoder.

The content transcoder can be programmed to apply different transformations to the code received from the remote server systems in response to different requests for the same content.

The system can have coverage within a corporate local area network.

The system can be operated by a commercial Internet Service Provider (ISP) in serving content to subscribers of the commercial ISP.

The client monitor subsystem can be arranged to report, from the ISP to a central security provider, information about client computing devices that cause generation of notifications.

A second system can be included with the system, the second system located between one of the remote server systems and the Internet, and having a second content transcoder programmed to apply countermeasures that match the countermeasures applied by the content transcoder, so that the countermeasures applied by the content transcoder become layered over the countermeasures applied by the second content transcoder.

The countermeasures can include applying polymorphic re-coding of the content, wherein the re-coding can differ for each of multiple different servings of the content.

One implementation includes one or more computer-readable media having instructions stored thereon that, when executed by one or more processors, cause operations to be performed. The operations can include receiving, at a computer security server system located between the Internet and a client computing device that makes requests over the Internet, a request for content directed to a particular content server system; forwarding the received request, with the computer security server system, to the particular content server system; receiving code from the particular server system in response to the request; applying a security countermeasure to the received code to create transformed code; providing the transformed code to the client computing device; receiving a communication from the client computing device; and determining that software on the client computing device has attempted to interact with the received code rather than the transformed code.

DESCRIPTION OF DRAWINGS

Like reference symbols in the various drawings indicate like elements.

DETAILED DESCRIPTION

This document describes techniques by which content (e.g., program code in the form of HTML, CSS, and JavaScript) that is served by a variety of Web server systems may be transcoded before it reaches a client that requested the content. Such transcoding may be performed to obfuscate the manner in which the content acts, so as to interfere with attempts by malware to interact with the content and exploit it. The transcoding may be performed in a different manner each time that the content is served, so as to create a polymorphic transcoding, and so as to create a moving target for any malware that is attempting to analyze the code. The transcoding may occur at various different locations along the path of the content being served, and in certain implementations, may occur multiple times at different points along the path of the code be served (including one or more times on the server side of the Internet and one or more times on the client side of the Internet). For example, an organization that serves the content may be interested in transcoding the content so as to prevent malware from stealing credentials of users who subscribe to the organization, such as users who perform online banking or who purchase goods online through a retail organization. In contrast, an Internet Service Provider (ISP) may wish to perform its own transcoding, both to protect the Internet from malware that may be lurking among its subscribers, and to prevent the use of malware which may unnecessarily put a load on the network of the ISP, and also hurt the reputation of the ISP as being an above-board provider of services. A corporation may wish to perform transcoding for reasons similar to that of the ISP, and more particularly, to be able to identify particular compromised client devices within the organization and remove compromising software from those devices. Further down the path of serving the code, individual residential routers may transcode the code that is being served so as to prevent improper interaction of computers within a user's home with the code. Such routers may have been provided by an ISP or other Internet-providing organization, and distributing such transcoding out to the last mile may be beneficial in more readily deflecting and detecting malware activity. Also, for the other organizations described above, detection of malware may also be a goal for purposes of identifying compromised client devices and gathering data for fighting against evolving malware activity, where the data may be processed at a certain level in the serving chain, or may be aggregated at a higher level for more complete and powerful processing.

Figure 1A:
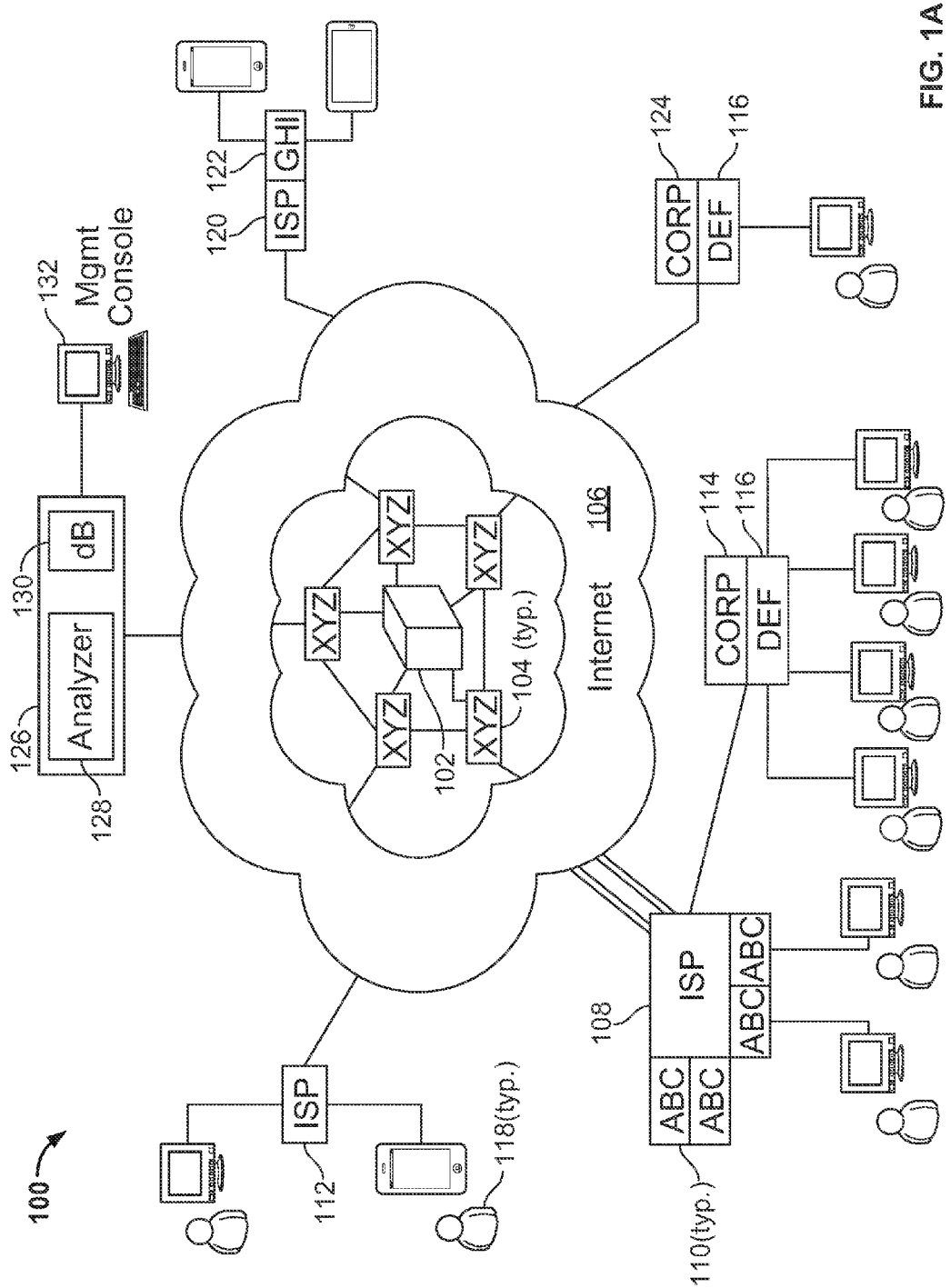
FIG. 1A is a conceptual diagram of a distributed multi-layer computer security system.

FIG. 1A is a conceptual diagram of a distributed multi-layer computer security system 100. In general, the system 100 shows a complete network system with a variety of security boxes distributed across the system 100. Each of the boxes may be programmed to provide both malware deflection and malware detection capabilities. Although referenced as boxes here for simplicity, the security devices may take a variety of forms, including both physical and virtual forms. For example, the devices may be actual rack-mounted special-purpose hardware that may be inserted into a network. Alternatively, the devices may be software or firmware that is incorporated into a device, such as an Internet router, that performs additional activities. In yet other implementations, the devices may be virtualized within a data center, such as by being provided in a "software as a service" (SaaS) offering by a security services company, to a variety of organizations that serve content over the Internet.

In this example, the Internet 106 is depicted as a ring-shaped cloud having at its center a content server system 102. In actual implementation, multiple different content server systems would be involved, including banking server systems, online retailer server systems, and other systems of organizations that want to prevent malware activity from interfering with their users and the data that they serve to their users. Surrounding the content server system 102 are a plurality of security devices 104. Each such device may be placed logically between a particular server of the content server system 102 and the Internet 106. The devices 104 may thus intercept requests made to the content server system 102 and intercept responses made by the content server system 102. In some implementations, a device 104 may be implemented as an integral part of a content server system 102, such as by the operations described here for such a device 104 (or for various security intermediaries described below) being carried out by the same server hardware, and potentially a common application, as that carried out for initially serving the content. For example, the security countermeasures discussed here can be applied as part of the serving of content by the content server system 102, in addition to or as an alternative to, changing the content after it has been served, and then forwarding or re-serving the content.

A plurality of devices 104 is shown here (rather than a single device) to indicate that, depending on the size and bandwidth needs of the particular organization, multiple devices 104 may provide additional needed bandwidth. Further hardware, such as load balancers and other hardware, has been omitted here to improve the clarity of the presentation. Though depicted as boxes, the devices 104 may be physical or virtualized server systems in a variety of different forms.

A variety of destinations for content served by the content server system 102 are shown around the edge of the Internet cloud 106. The variety provided here is intended to indicate different example implementations for security boxes but is not exhaustive.

In a first example, an Internet Service Provider (ISP) 112 is shown providing content to users 118. In this example, the ISP does not implement a security solution that is similar to that implemented by devices 104. Thus, user 118 will receive content that has been trans-coded and obfuscated by device 104, but not trans-coded in an additional step closer to the user 118.

ISP 120 shows an example of a provider that has implemented a device 122 that is the same as or similar to device 104. In this example, device 122 may be placed logically between the ISP and each of its customers and may monitor communications between the ISP and each of its customers. The device 122, for example, may analyze content to be served, and may transform and recode such content so as to interfere with the operation of potential malware on the client devices of its subscribers. As one example, the device 122 may identify a function name that is used throughout a set of code that is to be served, and may change the function name to a random string of alpha numeric characters, though it may make the change consistently throughout the code so as to avoid breaking the code. The particular alphanumeric string that is substituted may change for each time the device 122 serves the content, so that not only is the content obfuscated, but it is obfuscated polymorphically so as to create a moving target that the malware will be required to chase.

In this example then, the device 122 can interfere with the operation of malware operating on devices to which ISP 120 serves content, and can thereby dissuade fraudulent parties from subscribing to ISP 120. Such a result may benefit both the operator of content server system 102 and the operator of ISP 120.

A similar implementation is shown for ISP 108. In this example, the ISP 108 may be a larger ISP then is ISP 120, and thus may implement multiple devices 110 to provide transcoding and other countermeasures when it serves content to its subscribers. Each of devices 110 may perform the transcoding, and may be added or removed modularly by the ISP 108 as more or less bandwidth for serving content is required. ISP 108 is a relatively large ISP that serves individual and corporate customers, including corporation 114. In this example, corporation 114 may be served content either through a device 110 or without countermeasures being added by ISP 108. For example, ISP 108 may ordinarily apply security countermeasures, but may waive such countermeasures for sophisticated customers who are able to establish that they can supply equivalent levels of security themselves.

Corporation 124 may be a relatively larger corporation and may serve as its own Internet Service Provider. In this example, then, Corporation 124 implements a device 116 that is the same as device 116 implemented by corporation 114. In particular, such device may implement countermeasures to content that is served within the corporation to employees of the corporation, and may also include administrative functions so that an IT department in the corporation may identify where malware could exist and may work to eradicate such malware. For example, an administrator console application may be provided to corporation 124 when it purchases device 116, and the console application may perform a number of functions, including generating notifications when it has been determined that a device within the corporation that is served content is exhibiting anomalous behavior. Such anomalous behavior may include indications that software on a device is attempting to interact with code served by the device, by making calls to functions that are in the original version of the code but not in the trans-coded version of the code. Such action by outside software may indicate that the software is unaware that transcoding for security purposes has occurred, and that the software is thus malware that is trying to improperly interact with the content. In such a situation, the administrator console application may provide notifications, such as in the form of an email to an IT employee, identifying a device number for the particular device along with information indicating where the device is located within the Corporation. The administrator may then physically go to the device and interrogated to determine whether malware is actually on the device, such as by running particular anti-virus or other anti-malware software on the device itself.

Each of devices 104, 110, 116, and 122 may take the same or a different physical form, and may perform different or common operations on code that is served to clients that the device serves. For example, depending on the volume to be served, devices at different locations may be of different sizes, but all of the devices make apply the same form of security countermeasures, such as the same polymorphic obfuscation algorithms for code that they pass toward a client. Certain of the devices may have more or fewer additional features despite applying the same algorithm, such as features that allow professionals to manage the devices and to obtain data from the devices. For example, an ISP or large corporation they want to be able to be notified about activity within the ecosystem served by that entity, so that a professional management console may be provided with a device that is sold to such organizations. Various features of a console may include notifications about anomalous activity within a network, like that described above.

The various devices shown here may operate generally independently of each other or in a partially or fully coordinated manner relative to each other. Independent operation may involve each device simply applying security countermeasures without knowledge of what other devices are doing for countermeasures. For example, where transcoding occurs, multiple layers of such transcoding may occur in sequence and not break the other layers as long as each layer properly changes its level of content in the serving download and upload directions, and evenly across all the content. Such operation across multiple layers may occur without communication between different devices at different layers so as to coordinate their transformation of the code.

In other instances, devices at different layers may coordinate with each other to different degrees. For an example of minimal coordination, each of the devices at different levels may be programmed to report information about anomalous behavior in the network portion that they manage to a central management system 126, which may be operated by a company that manufactured and sold the devices to the various entities. Such a services company may use the information in manners like those discussed below to analyze information across multiple entities and large numbers of servings of content to help identify emerging malware threats and to develop improved countermeasures against those threats. Such a company may complete the circle by providing countermeasure updates out to the various devices and coordinate the operation of such devices to maximize their effectiveness in blocking and identifying the presence of malware.

In an example of deeper coordination, devices at different levels may perform transformations that depend on those performed at other levels. For example, a device at an ISP may look for a particular flag in the content that indicates that the content has been previously transformed with a particular countermeasure, and may either make no additional transformation at all so as to save on bandwidth, or may add a countermeasure that is known to be complementary with the initial countermeasure, where the central management system 126 may provide instruction or the coordination may occur through messages transmitted with the content.

Referring now more specifically to the central management system 126, the system 126 includes, among other things, an analyzer 128 and a database 130. The database 130 may store information that includes logs of reports of anomalous behavior from various ones of the devices in a security system network such as devices 104, 110, 116, and 122. The analyzer 128 may be programmed to perform various types of analysis on the data in database 130, including aggregated forms of the data from across multiple different content sources and recipients of content. The analysis 128 may group the data in various ways he for performing the analysis, such as by looking at data reported for particular types of served content, so as to identify malware threats that may be common for those types of served content. The grouping of data may also occur according to the type of customer, such as by the analyzer 128 looking to data for banking customers or online retail customers to determine the sorts of malware threats that such customers face. The data may also be filtered according to the actual customer, so that an organization that runs the system 126 may perform personalized analysis for that particular customer so as to identify potential threats to the customer and to indicate to the customer what threats exist and what threats have been removed by the system 126. Such operation of the system 126 may be managed by way of a management console 132 which may be one or more computer terminals operated by employees of the security service company that supplied the various devices, and may be connected to the system 126 by a local network or a wide area network.

The various devices and associated analysis and control systems may perform deflection of malware (e.g., by performing polymorphic serving) and detection of malware (e.g., by serving instrumentation code with the normal web code, where the instrumentation code executes on the client to detect anomalous behavior, such as external software that tries to interact with the served content in an odd way—e.g., with the external software interacting in a way that makes sense for the content that was originally served by the server system (or the content as it was received by the transcoder system that is performing the detection), but does not make sense for the transcoded content.

By having devices—implemented as hardware (e.g., a rack-mounted box), software (e.g., as SaaS), or a combination of the two—implemented at multiple possible points along the transmission of Internet content, then, various entities may implement security countermeasures to further their own individual ends, and also to further coordinated goals. For example, content servers may employ security intermediary systems so as to make their content less vulnerable to reverse engineering, so that they and their customers are less likely to be the victims of fraud. Other entities along the route may wish to make their portions of the Internet inhospitable to botnets and other malware. Such desire may be simply to reduce pointless bandwidth hogging that may occur when such automated software operates. It may also help an ISP in negotiating favorable deals with content providers.

Figure 1B:
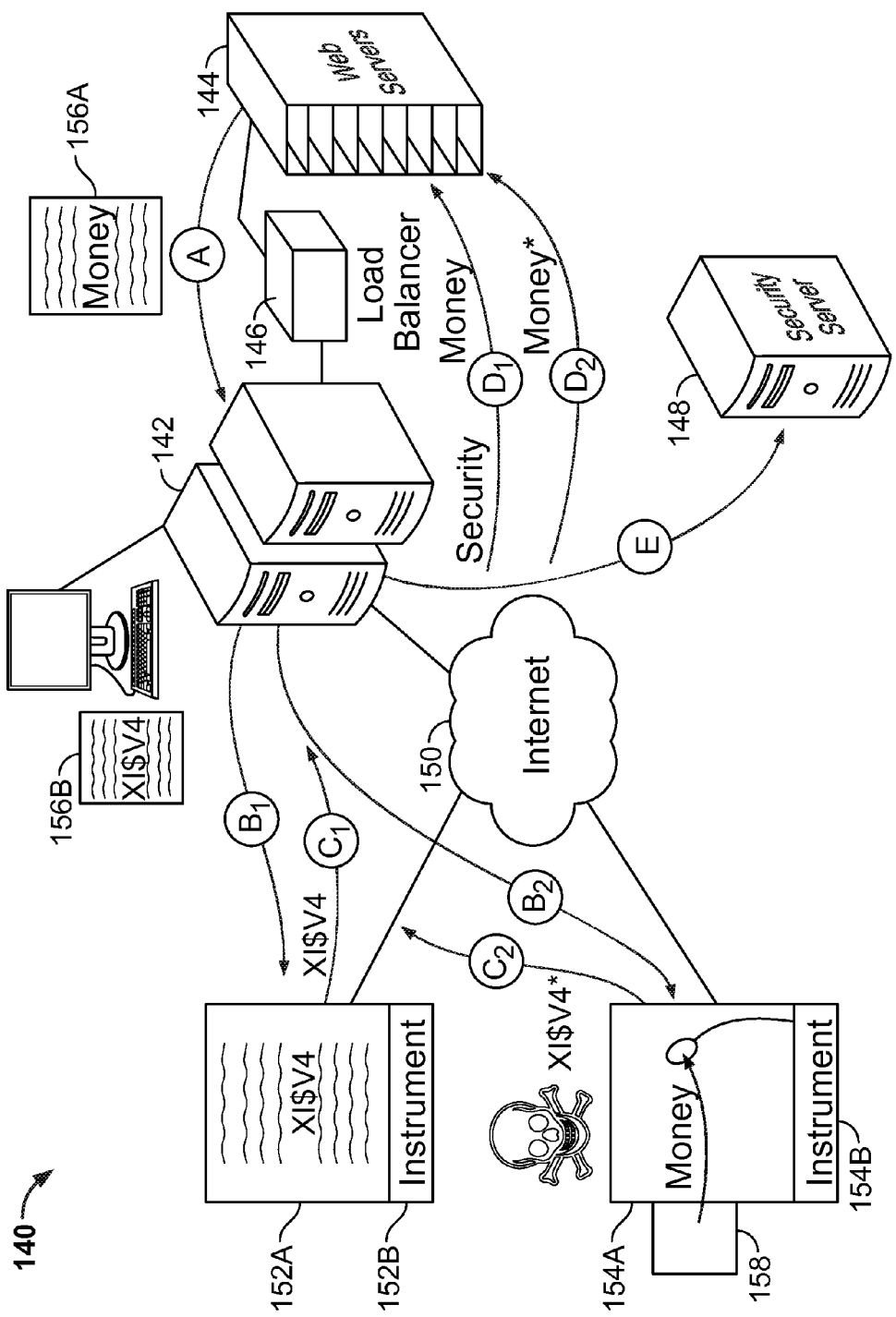
FIG. 1B is a schematic diagram of a transcoding subsystem that can be used in a system like that shown in FIG. 1A.

FIG. 1B is schematic diagram of a transcoding subsystem that can be used in a system like that shown in FIG. 1A. In particular, different entities at different levels in the system 100 of FIG. 1A may be able to deploy systems like that shown here to carry out a number of different isolated or coordinated countermeasures against malware. In this example, a web server 144 responds to a request from client devices 152 and 154 for an electronic resource. The web server 144 accesses or generates the resource, which in the example is a webpage 156A relating to a financial transaction. For instance, the web server 144 may serve an online banking site, www.example-bank.com. The webpage 156A may provide HTML or similar forms for account holders at the client devices 152 and 154 to institute an electronic wire transfer. The forms may include fields that allow the account holders to indicate a source account, a destination account, and the amount to transfer. The webpage 156A may implement the form with HTML tags such as <form> and <input> tags that are each identified by a name. For instance, the destination account field is named "money_dest." The client devices 152 and 154 can use the names in submitting form data to the web server 144 through a GET or POST HTTP request method, for example.

Before the system 140 transmits the webpage 156A (or more precisely, code that when rendered or otherwise executed by a browser application, generates the webpage 156A) over the internet 150 and to each of the client devices 152 and 154, the webpage 156A is directed to the security intermediary 142. The load balancer 146 may determine which security intermediary 142 to direct the webpage 156A to in implementations where there may be multiple, redundant security intermediaries 142. Though one security intermediary 142 is shown here, multiple intermediaries may be placed by the entity that operates the web server 144 (either directly or through contract with a third party security service provider)

A policy engine at the security intermediary 142 may determine how the security intermediary 142 will process the webpage 156A. For example, the policy engine may determine that the webpage 156A, which pertains to sensitive financial transactions, is part of a resource family that the intermediary 142 has been configured to modify and for which it is to insert instrumentation code. Other resources from the banking site, such as its homepage, may contain less sensitive information and may be subject to lower-level security policies such that the security intermediary 142 may handle the homepage with less sensitivity than the wire transfer webpage 156A. The policy engine may be programmed to operate differently depending on the location in the network at which the intermediary 142 is located—e.g., a policy engine for an intermediary at an ISP may implement different countermeasure policies than does a similar intermediary operating at a server site. In addition, the code may be annotated with parameters that are not implemented by a browser (e.g., that are coded into comments) but that can be read by the security intermediary 142 to determine the sort or level of security measures that the intermediary 142 should impose on the content.

At steps B1 and B2, the security intermediary 142 processes the webpage 156A according to the governing security policy and transmits processed webpage 156B to client devices 152 and 154 (where the client devices 152 and 154 with or without the content also passing through another security intermediary). First, the security intermediary 142 may modify elements of the webpage's 156A implicit API, such as field names, function names, and link references.

In the example operations of the system 140, the security intermediary 142 changes the name of the destination account field in webpage 156A from "money_dest" to "x1$v4." The name change obscures the identity of the field to prevent malware 158 from learning how to exploit the field. Moreover, the security intermediary 142 can apply different pseudo-random modifications each time the webpage 156A is served to prevent the malware 158 from tracking patterns that the malware 158 could use to exploit the web server 144 or initiate a fraudulent transaction, for example. Other techniques for obscuring content, including obscuring the environment in which web code such as JavaScript operates, are discussed further herein.

The change can also occur according to an "analyze once, transcode many" approach. In particular, the security intermediary 142 may analyze content for a page the first time the page passes through it. Such analysis may result in the intermediary 142 creating a map or template that identifies locations in the content, e.g., via flags or pointers, where changes in the content will be made—certain common pointers pointing to multiple locations where the same change needs to be made across the content. The map or template may then be saved, and if a subsequent request is made for the content, the system may simply insert relevant content where the pointers point, without a need to repeat the analysis, which can be relatively computationally expensive.

In addition to transcoding the served content itself, the security intermediary 142 can insert instrumentation code into the content that can detect certain activity that may indicate alien content (e.g., malware 158 or legitimate code on a client device 152 or 154 that interacts with a web page, such as a browser plug-in), and can report the detected activity back to the security intermediary 142 and/or a central security server 148.

Instrumentation code may also collect information about particular activity that occurs on the client device 152 and/or 154. For instance, the instrumentation code may collect information about how a user interacts with the web page such as key strokes, mouse movements, changes in focus between particular forms, fields, or frames, and patterns and timing of interactions with the page. Information about the user's operating environment may also be collected, such as network configurations, operating system information, hardware specifications, performance indicators, session identifiers, other cookies, browser type, browser settings, IP address, MAC address, client device type, plug-ins, screen resolution, installed fonts, timestamp, site or page identifier, GPS data, etc. In some implementations, users and system operators can configure the instrumentation code to restrict or anonymize the data that it gathers to respect user privacy.

The security intermediary 142 can also include an identifier, such as a session identifier in a cookie, with the processed web page 156B that it transmits. The security intermediary 142 can store the identifier in a data structure, table, or database that correlates the original content with the modified content for a particular resource so that the security intermediary 142 can apply reverse modifications to requests based on modified resources before forwarding the request to the web server 144. For example, the security intermediary 142 may assign a unique identifier to the webpage 156A, and store the identifier in a table that associates the resource's original field name, "money_dest," with the modified field name "x1$v4." Later transactions posted to the web server 144 from the modified page 156B can be received by the security intermediary 142 for reverse modification before forwarding the request to the web server 144. The security intermediary 142 can determine which reverse modifications to apply based on the identifier. In some implementations, the identifier can be a session identifier. The identifier may also be passed to a client and stored there (e.g., in a cookie) and then passed back with a request, where the passed cookie may serve as a key to the reverse transformation, so that the security intermediary 142 need not store state information about content it has passed t clients.

The transformation of the resources may occur multiple times on its path after being served. For example, a security intermediary 142 may first modify a resource at the location of the entity that served the resource, and the first-modified resource may be served over the Internet. A second security intermediary at the home of a user or at a corporation firewall or ISP may then transform the resource a second time before passing it on. Such transformations may occur quickly and without a perceptible delay or with a barely perceptible delay for a user. Also, the transformations may be limited to only particular secure pages (e.g., log in screens or screens for completing financial transactions)

At step C1, client device 152 has received the modified (i.e., processed) web code of web page 156B. Client device 152 is a clean device in that no malware 158 that is configured to attack the online banking website has infected client device 152. A user at the client device 152 provides into the fields on the web page 156B the necessary information to complete a wire transfer, such as an indication of the source account, destination account, and transfer amount. A user of the client device 152 may then submit the request for a wire transfer, which a browser on the client device 152 converts into an HTTP request to the web server 144, the request including the information submitted by the user along with corresponding field names. The HTTP request from client device 152 uses the random field name that the security intermediary 142 generated for the destination account field, "x1$v4."

Instrumentation code 152B can monitor the webpage 1568 on client device 152. In some implementations, the instrumentation code 152B may determine that malware 158 activity or other anomalous activity has altered the webpage 1568 and may be attempting to initiate an unauthorized transaction. For example, the instrumentation code 152B may include information about the modified web code for web page 1568, and may be programmed to detect when elements of the modified code are altered at the client device 152. For instance, the instrumentation code may determine whether the document object model ("DOM") for the webpage has been altered, or if the HTTP request based on the web page 156B uses unexpected values that do not correspond to the modified web code delivered in web page 156B. For instance, the instrumentation code may detect that the client device 154 has called an original function value rather than its modified, replaced value.

Malicious activity can be both detected and deflected in relatively sophisticated manners by changing the environment in which executable code on the client device, such as JavaScript, operates. Detection can occur by identifying certain JavaScript operations or calls that may be made on a page, and instrumenting code that is served with a web page so as to report to a security server system when such operations occur and/or such calls are made (along with information that describes the actions). Deflection occurs by the constant changing of code elements as they are served each time, such as changing the names of elements that will be called by malicious JavaScript, so that the malicious code can never catch up with the changes, and thus gives itself away when it tries to interoperate with code known by the system to be stale. As one example, a common method for making changes to a DOM for a web page is the document.write method, and may be used by malicious code to surreptitiously change what the user of a computing device sees on a web page.

A security system can (1) instrument served code corresponding to such a method so that the instrumentation code reports calls to the method, and additionally includes data that characterizes such calls, so that the system can detect abnormal activity and perhaps use the additional data to determine whether the abnormal activity is malicious or benign; and (2) change the function name to "document.#3@1*87%5.write" or some other legal name that includes random text that can be changed automatically each time the code is served. Such constant changing creates a real challenge for a malicious party seeking to write code that can keep up with the changes, and also flags the presence of the malicious code when it attempts to interact with an outdated method name, and is reported by the instrumentation code. Other examples of JavaScript actions that can be instrumented and continually changed include "getElementById," "getElementByName," XPath commands, and setting of HTML elements in the DOM to particular values.

The complexity for the malware can increase even more when the code is transformed multiple times by different sub-systems along a path as it is being served to a client. If the malware can determine how the "closest" security system obfuscated the content, it still will not obtain the original content that it can analyze. Rather, the malware will then need to reverse engineer the first level of analysis also. Each such attempt to interact with the content both creates more trouble for the malware, and also increases the chance that the malware will instigate activity that tips its hand, and can be identified by instrumentation code or otherwise.

As instrumented code executes on the client devices 152, 154, the code may collect information that characterizes events and statuses of a web page or other resource as described, and may report the information in various manners. In some implementations, the information can be sent to the security server 148 and/or the security intermediary 142. The security server 148 may receive instrumentation reports directly from the client devices 152, 154, or indirectly through the security intermediary 142. The instrumentation code may generate and transmit reports periodically or upon request. Reports can also be transmitted in subsequent HTTP requests from the client device 152, 154 to the web server 144, and can be received by the security intermediary 142. Alternatively or in addition to these techniques, instrumentation reports can be sent to the security intermediary 142 or security server 148 asynchronously, such as through the use of AJAX or WebSocket.

Multiple different security management systems at different levels in the network may receive such reports, and the data sent to the different levels may be the same or different. For example, a security system at a LAN level may obtain information sufficient to characterize certain anomalous behavior and to locate the client device on which it has occurred. A security system further up the network (e.g., one operated by a company that provides security services and hardware to a wide variety of customers) may receive similar information that characterizes the anomalous behavior and also information that characterizes the client device, though in an anonymized manner. The additional information may include, for example, information about the hardware model and type, operating system, and browser used on the device, so that the central security system can more readily identify that certain emerging malware threats are appearing first under a particular operating system, or identify other relevant information about an outbreak.

At step C1, malware 158 has not interfered with the transaction, and the HTTP request includes the appropriate modified field names such as "x1$v4" for the "money_dest" field. Therefore, the instrumentation code 152B does not report the presence of anomalous or malicious activity to the security intermediary 142.

At step C2, client device 154 is shown to have received the modified (i.e., processed) web code for web page 156B. Unlike client device 152, however, client device 154 is compromised with malware 158, such as a man-in-the-browser bot. When a user of the compromised client device 154 submits the wire-transfer transaction, the malware 158 may intervene and replace the destination account field name with "money_dest"—the original field name before the security intermediary 142 modified web page 156A. The bot may use the original field name, for example, based on previous analysis of the banking website, by it or its fraudulent organization, in instances where the security intermediary 142 did not modify the field name.

The instrumentation code 154B can detect the behavior or consequences of the behavior of malware 158, and generate a report to alert the security intermediary 142 and/or the web server 144 of suspicious activity. The instrumentation code 154B in FIG. 1B, for example, reports the suspicious activity by causing the HTTP request that the user submits for the transaction to include the field name "x1$v4*" in place of the malware's 158 field name "money_dest." The asterisk appended to the end of the modified field name indicates that the instrumentation code 154B detected suspicious activity.

At steps D1 and D2, the security intermediary 142 receives the HTTP requests for the wire-transfer transaction from client devices 152 and 154, decodes the requests, and forwards the decoded requests to the web server 144. The HTTP requests from the client devices 152 and 154 may include a cookie having a session identifier that the security intermediary 142 can use in decoding the HTTP requests. The security intermediary 142 can use the data from the cookie as a translation decoding key or can look up the session identifier in a translation table, and decode the request by applying reverse modifications that restore the original field and function names, for example. With respect to the request that the intermediary 142 receives from the clean client device 152, the intermediary 142 receives the substitute field name "x1$v4" as expected, decodes the field name by replacing it with "money_dest" and forwards the request to the web server 144 through the load balancer 146. The operation of security intermediary 142 is transparent to the web server 144, and the web server 144 can process the transaction according to the user's request.

With respect to the HTTP request from the compromised client device 154, the security intermediary 142 recognizes the report of suspicious activity by instrumentation code 154, and sends an alert to the web server 144. The security intermediary 142 can use the session identifier in the HTTP request to determine the appropriate reverse modifications necessary to decode the request. The security intermediary 142 may recognize that the field name "x1$v4*" corresponds to the original "money_dest" field name, but that the instrumentation code 154B appended an asterisk to the field name to indicate possibly malicious activity.

The security intermediary 142 can respond to the indication in various ways according to the applicable security policy and/or system configuration settings. In one example shown in step D2, the intermediary 142 forwards the decoded request to the web server 144, but appends the asterisk to the destination account field name, "money_dest*," to notify the web server 144 that the transaction is suspicious, and may indicate the presence of unauthorized alien content. In response, the web server 144 may ignore the alert, complete the transaction and log the alert, refuse to complete the transaction, pretend to complete the transaction, and/or take other appropriate action. In some implementations, the security intermediary 142 may not forward the transaction request to the web server 144 if suspicious activity has been detected.

When transformation has occurred at multiple levels in the serving, the first intermediary to receive a request or a report from instrumentation code can report the activity to a central system. Also, where instrumentation code has been added by a first intermediary, the second intermediary may recognize the presence of the instrumentation code and leave it alone so that it continues to report back to the system that created it. The second intermediary may also alter the instrumentation code slightly so that reports from the instrumentation code are copied to it also.

At step E, the security intermediary 142 may forward information about the transactions between the web server and the client devices 152 and/or 154 to the security server 148 (or multiple different security servers operated by different entities). For example, the security intermediary 142 may share information about the transaction from client device 154 in which the instrumentation code 154B reported suspicious activity.

The instrumentation code 154B may include a report about the detected suspicious activity and its circumstances that the security intermediary 142 can provide to the security server 148. For example, the report may include information about the client device 154, the abnormal or suspicious activity, the electronic resources and fields involved, and information about the browser, operating system, or other application that the malware 158 may have compromised. Data from the security server 148 can be analyzed with respect to the security intermediary 142 for a particular site, or in aggregate with information from other security intermediaries 142 that serve other websites and web servers 144. The security server 148 can analyze data across multiple computing sessions and for multiple client devices. The analysis from the security server 148 can be used, for instance, to identify new threats, track known threats (e.g., for a corporate-level security system, to ID the particular client device and its physical geographic location), and to distinguish legitimate abnormal or alien activity from malicious activity.

Figure 2:
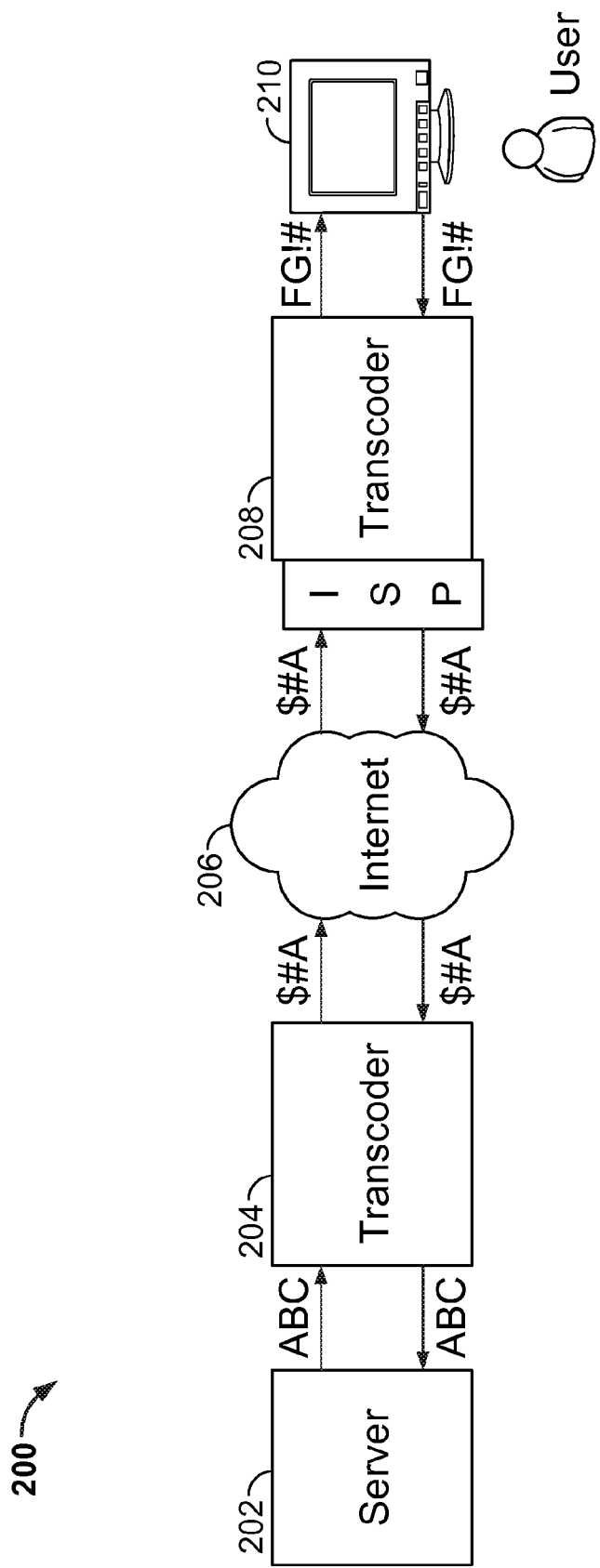
FIG. 2 shows a conceptual flow of information through a distributed multi-layer computer security system.

FIG. 2 shows a conceptual flow of information through a distributed multi-layer computer security system. In general, what is shown is a single serving and request transaction between a client device 210 and a server system 202 by which security systems in the path between the client device 210 and the server system 202 operate to impose security countermeasures on the content that is served and on the request from the client device 210. The example here is directed mainly at showing how multiple stacked levels of content transformation may be employed in such a system as those described in FIGS. 1A and 1B.

The system 200 shown here includes a server system 202 communicating through the Internet 206 with a client device 210, where such communication may occur by typical mechanisms such as a Web server system communicating with a Web browser that makes requests to the Web server system. The client device 210 communicates with the Internet through an Internet service provider (ISP) in a conventional manner. For example, the server system 202 may be operated by a bank with which a user of the client device 210 does business, and the user may navigate his or her web browser to a website of the bank in order to perform online banking, such as to transfer funds from one bank account to another.

In this example, the bank has purchased a transcoder 204 (e.g., the security intermediary 142 of FIG. 1B) and situated it between its server system 202 and the Internet 206. The transcoder 204 may perform polymorphic transformations on code that the bank server system 202 serves, and may perform reverse transformations on requests coming back from the client device 210. For example, in this case, the bank website transmits a string in the form of the letters ABC, which would be transmitted along with many other forms of content. The transcoder 204 may determine that the string is part of a function name or other part of content that can be altered without affecting the manner in which the content is displayed to the user on client device 210. As a result, the transcoder 204 may replace all instances of the string function name ABC with the random characters $#A, which it then transmits through Internet 206 to the ISP. Transcoder 204 may also perform a number of other, additional transformations on the content before transmitting it.

The ISP may have purchased its own example of a transcoder 208 to provide additional security countermeasures for any content that it serves, where such content may come from an organization that has its own transcoder or from organizations that do not have transcoders. In this example, the transcoder 208 may analyze the code and recognize that the string $#A is a function name that they can be changed without affecting the manner in which the code is displayed on the client device 210. As a result, the transcoder 208 changes that string to a different string, FG!#, everywhere that the string appears in the code. The ISP then forwards the trans-coded content to the client device 210.

Requests from the client device 210 back to the server system 202 generally operate in the inverse manner from that just described. For example, if a user makes a selection of content associated with a variable name or function name, that variable name or function name may be embedded in a request, such as in a URL, submitted in an HTTP request from the client device 210 to the server 202. In this example, because the client device 210 received the function name in the form FG!#, that is the same string that the client device 210 will use in transmitting the request that identifies a user input into a field for such a function. However, the transcoder 208 will be watching transmissions from the client device 210 back to the server system 202 and will intercept the request. The transcoder 208 will apply the reverse transform than it applied to that string when it was serving the content, so that the ISP passes the string $#A through the Internet and back toward server system 202.

Such transmission will be intercepted by transcoder 204, which will recognize the string as being one that it previously transcoded, and it will apply a reverse transformation to the string, changing the string from $#A to ABC. The transcoder 204 will then pass the string back to the server system 202. As a result, server system 202 can process the request as if nothing had occurred to the content during the transmission and return process.

In this manner, levels of security and countermeasures have been applied to the data transmission even though the transcoder 208 does not need to know about the transcoder 204, the transcoder 204 does not need to know about the transcoder 208 and can actually perform adequately without the second level of transcoding, and the server system 202 does not need to know about the transcoder 204 or the transcoder 208. Thus, for example, transcoder 204 can be easily added to a system that did not previously have such a form of security provided to it. Or, transcoder 204 may be used selectively with server 202—switched in or out of the flow into and out of server 202, and such turning on or off of the security feature need not affect the operation of server system 202. For example, the transcoder 204 may be used to add security to only a subset of URLs for a web site (e.g., pages with security concerns), or even pages that are ordinarily transcoded can be left alone if the security system is under a present high processing load—where the unprotected page may be somewhat more vulnerable to manipulation, but anything malware learns because of a temporary lack of obfuscation can be overcome by regular polymorphic transformation down the road.

Figure 3:
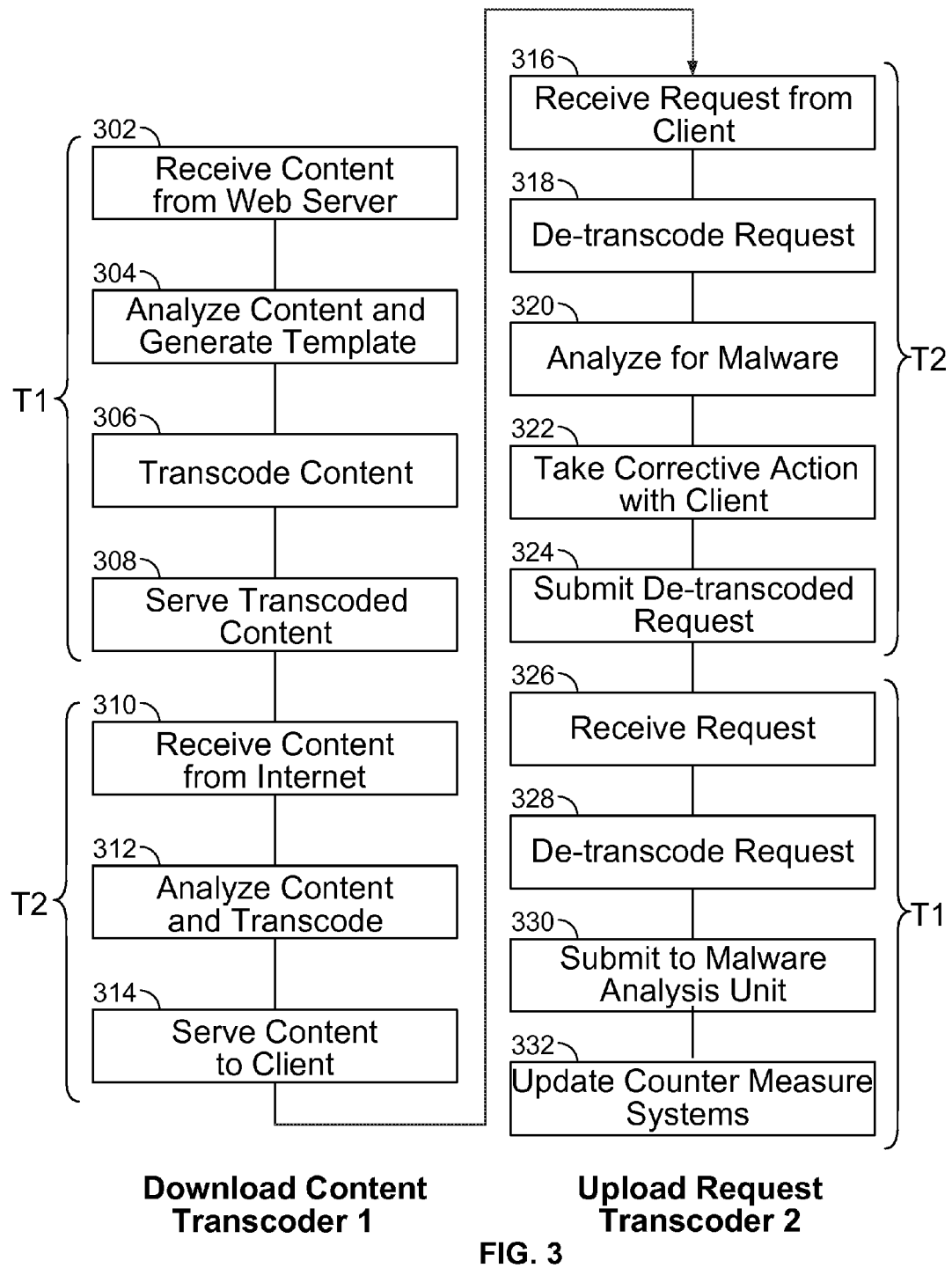
FIG. 3 is a flow chart showing multi-level polymorphic transcoding of served content and requests.

FIG. 3 is a flow chart showing multi-level polymorphic transcoding of served content and requests. The process shown here may be carried out by one or more security devices as described with respect to FIG. 1A, 1B, or 4.

In general, the process shows operations that may be performed by a pair of transcoder's, T1 and T2, that are arranged in series with each other. The series arrangement may not be physical, but may instead be created by switching of data through the Internet. For example, a transcoder operated by a particular retailer may serve content to a number of different client devices and may periodically happen to serve to devices that are provided content by a particular ISP. In those particular situations, if the ISP operates the second transcoder, then the two transcoders will operate sequentially and stacked. In other instances where the retailer serves code to an ISP that does not have a transcoder, there will not be such sequential operation. Similarly, other retailers may not have transcoders, and an ISP may have a transcoder, so that the only transcoding will be on the client-side of the Internet rather than on the server side of the Internet.

The process begins a box 302, where the first transcoder receives content from a Web server. Such content may be formatted in a variety of manners, and may include markup language content, style sheet content, JavaScript or other executable program content, and a variety of other forms of content.

At box 304, the first transcoder analyzes the content and generates a template for it. For example, the analysis module in the transcoder may identify particular elements in the code to be served that are amenable to transformation without affecting the manner in which the code presents to a user at a client device. As just one example, the transcoder may form a template that points to the location of particular instances of those components, such as one pointer that points to every instance for a particular function name, and another pointer that points to all instances of a particular variable name or field name.

At box 306, the first transcoder transcodes the content using the template. For example, the template may indicate the presence of and locations throughout the served code of a particular variable name, and the transcoder may select a random string to represent that variable name and then use the template to insert that random string at each instance where the variable name occurs in the content. At box 308, the first transcoder serves the transcoded content. For example, if the first transcoder is implemented as an intermediary between a server system and the Internet, the first transcoder may serve the transcoded content through the Internet to an IP address associated with the client device, and the content may be routed to an ISP for that client device.

At box 310, the second transcoder receives the content from the Internet. At box 312, the second transcoder analyzes the content and transcodes the content. Such transcoding may be similar to the analysis and transcoding shown in boxes 304 and 306. For example, the second transcoder may also recognize the presence of the same function names and variable names, though in each instance the names will be different than they were originally. The second transcoder may itself select a random string to replace the particular random strings that were already replaced by the first transcoder, though the second transcoder may not need to recognize that the strings it is looking at were previously replaced (it just accepts them as being regular string values). If the second transcoder works according to the same algorithm as the first transcoder, it may end up replacing all of the same sorts of elements as the first transcoder did. However, the second transcoder may work by a different algorithm and may select different elements in the content to receive treatment for transcoding.

At box 314, the second transcoder serves the content to the client. Therefore, the client will receive content in which certain variable and function names have had their names changed once or twice from the names that they had when leaving the server system. Such changes prevent malware from interacting with the code if the malware is attempting to make calls to the variables or functions using the names that the server had given them, because the malware was programmed by a malicious party looking at previous serving of code from the server system. The user of the client device may then interact with the served code in a variety of ordinary manners, such as by selecting objects in the code by clicking with a mouse, by filling out a web form, or performing other standard interactions with the code and the rendered webpage.

At box 316, the second transcoder receives a request from the client device. For example, a user of the client device may have filled in a name and password on a form for obtaining credentials for logging in to a system operated by the company that runs the server system. The request may identify the field that the user filled in by employing a field name that was provided with the served code. The field name may have been recognized as a name that could be changed by the two transcoder's, so that when the code was served to the client device, the field name had a random name assigned to it.

At box 318, the second transcoder de-transcodes the request. Such an action may involve identifying the presence of the field name that was previously trans-coded in identifying a need to perform a reverse transcoding on the name. The second transcoder may identify the transaction in various manners such as by cookie data sent by the client device, so that the reverse transcoding can occur in a manner that is inverse to the initial transcoding.

In addition, the second transcoder may analyze the request for an indication that malware is present on the client device, at box 320. For example, if the request includes a field name that does not match the code that the second transcoder served to the client device, the second transcoder may recognize that as an indication that code on the client devices interfered with the code that was served, such as malware attempting to fake a login or capture login information.

At box 322, the second transcoder takes corrective action with the client. For example software operating with the transcoder may be programmed to receive reports of anomalous activity from the transcoder and notify one or more personnel at the organization that operates the second transcoder. Such notification may occur as a message sent to an IT employee at the company, as a log of anomalous behavior, or in other relevant forms. Such employees may then take appropriate steps with respect to the anomalous behavior such as interpreting it, and if the interpretation indicates that there may be malware, then going to the physical machine and executing software on the machine to identify whether malware is present and to get rid of the malware.

At box 324, the second transcoder submits the detranscoded request back to the first transcoder, and at box 326, the first transcoder receives the request. In this example, the request will now include a name for the particular form field that matches a name that was in the code provided initially by the first transcoder. That name may have been a name that the first transcoder already transcoded to a random string of characters. At box 328 the first transcoder recognizes that the name has previously been transcoded, and it performs a reverse transcoding on the name, which in this example, involves generating a name that matches the name originally served for the field by the server system.

At box 330, the first transcoder submits information to a malware analysis unit. For example, if the request included indications of anomalous behavior, such as an improper field name as discussed above, the first transcoder, which may be operated by a very large organization that contracts with the security services company, may provide information back to the security services company for further analysis. For example, the first transcoder may provide information that characterizes the anomalous activity, including a URL for the content that was originally served, the field name in that content that was transcoded, the field name that was incorrect and submitted back to the first transcoder, an IP address associated with the serving of the code, configuration information about the device to which the code was served (e.g., make and model of the computer, the operating system type and version, and the browser type and version), and other parameters that may be helpful to the security analysis process.

At box 332, the first transcoder may update its countermeasure systems. For example, because the first transcoder's organization subscribes with the security services company, the security services company may perform advanced analysis on the data it receives and may identify that current countermeasures have been caught up to by the particular malware threat. As a result, the security services company may automatically or manually generate new countermeasures and may push those countermeasures out to subscribers, as is shown by box 332, where the first transcoder is such a device that receives the new countermeasures and updates its operation automatically with the new countermeasures.

Figure 4:
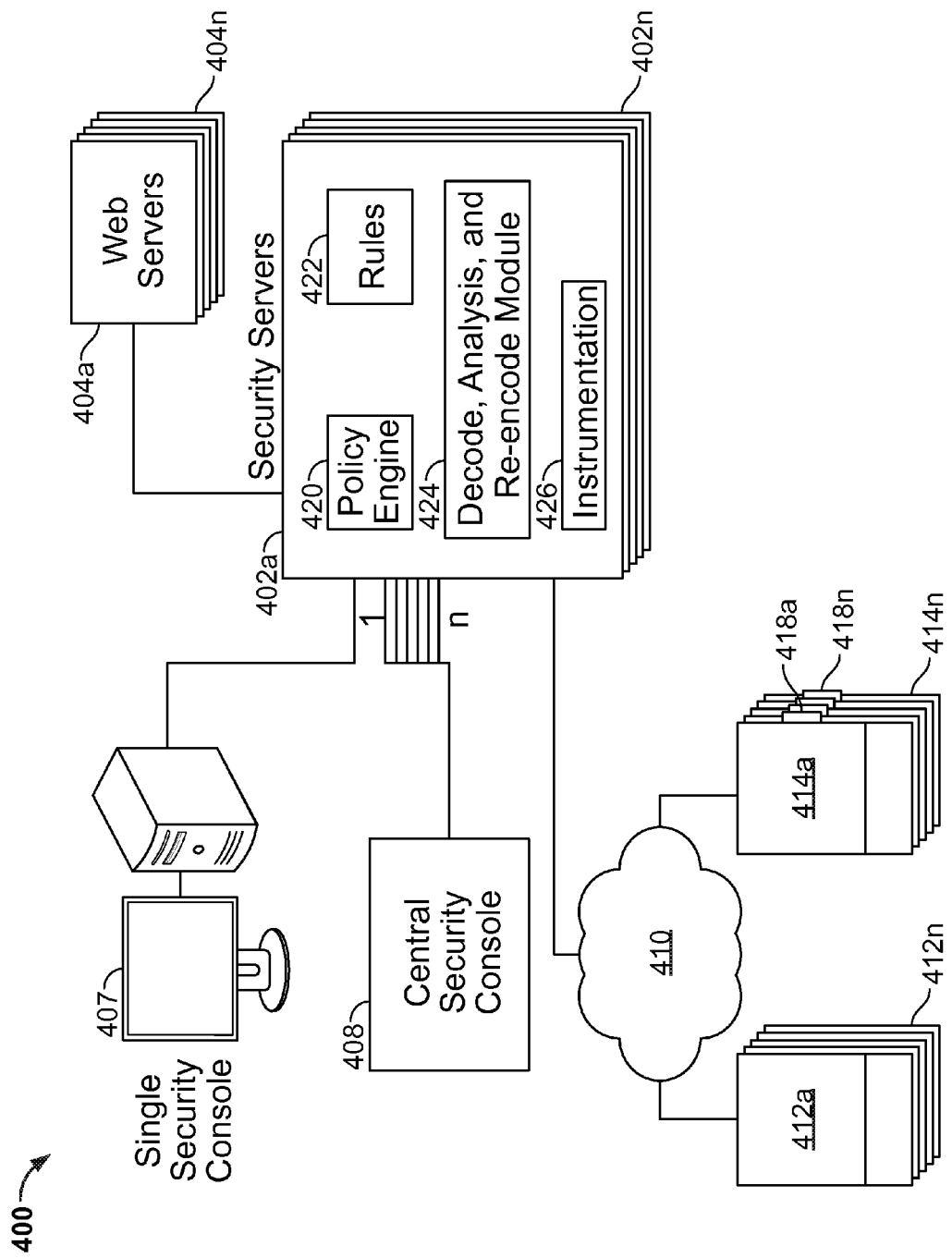
FIG. 4 shows a system for serving polymorphic and instrumented code.

FIG. 4 shows a system 400 for serving polymorphic and instrumented code. Generally, polymorphic code is code that is changed in different manners for different servings of the code in manners that do not affect the manner in which the executed code is perceived by users, so as to create a moving target for malware that tries to determine how the code operates, but without changing the user experience. Instrumented code is code that is served, e.g., to a browser, with the main functional code and monitors how the functional code operates on a client device, and how other code may interact with the functional code and other activities on the client device.

The system 400 may be similar to system 140 in FIG. 1B and may be adapted to perform deflection and detection of malicious activity with respect to a web server system. Deflection may occur, for example, by the serving of polymorphic code, which interferes with the ability of malware to interact effectively with the code that is served. Detection may occur, for example, by adding instrumentation code (including injected code for a security service provider) that monitors activity of client devices that are served web code.

The system 400 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 404a-404n, and could include a broad array of web servers, content servers, database servers, financial servers, load balancers, and other necessary components (either as physical or virtual servers).

In this example, security server systems 402a to 402n may cause code from the web server system to be supplemented and altered. In one example of the supplementation, code may be provided, either by the web server system itself as part of the originally-served code, or by another mechanism after the code is initially served, such as by the security server systems 402a to 402n, where the supplementing code causes client devices to which the code is served to transmit data that characterizes the client devices and the use of the client devices in manners like those discussed in the many examples above. As also described below, other actions may be taken by the supplementing code, such as the code reporting actual malware activity or other anomalous activity at the client devices that can then be analyzed to determine whether the activity is malware activity. Multiple such systems may be implemented at a particular level in a network to provide greater processing bandwidth, or at different levels in a network, whether in a coordinated or uncoordinated manner, so as to introduce countermeasures at different locations (e.g., to plug holes or to provide even greater protection by applying stacked countermeasures).

The set of security server systems 402a to 402n is shown connected between the web servers 404a to 404n and a network 410 such as the internet. Although both extend to n in number, the actual number of sub-systems could vary. For example, certain of the customers could install two separate security server systems to serve all of their web server systems (which could be one or more), such as for redundancy purposes. The particular security server systems 402a-402n may be matched to particular ones of the web server systems 404a-404n, or they may be at separate sites, and all of the web servers for various different customers may be provided with services by a single common set of security servers 402a-402n (e.g., when all of the server systems are at a single co-location facility so that bandwidth issues are minimized).

Each of the security server systems 402a-402n may be arranged and programmed to carry out operations like those discussed above and below and other operations. For example, a policy engine 420 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their inter-operation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 402a-202n, such as by the security servers 402a-402n implementing a web crawler (not shown) to recursively search for new and changed content and to report such occurrences to the security servers 402a-402n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 422 may store analytical rules for performing such analysis and for re-encoding of the content. The rules engine 422 may be populated with rules developed through operator observation of particular content types, such as by operators of a system studying typical web pages that call JavaScript content and recognizing that a particular method is frequently used in a particular manner. Such observation may result in the rules engine 422 being programmed to identify the method and calls to the method so that they can all be grouped and re-encoded in a consistent and coordinated manner.

The decode, analysis, and re-encode module 424 encodes content being passed to client computers from a web server according to relevant policies and rules. The module 424 also reverse encodes requests from the client computers to the relevant web server or servers. For example, a web page may be served with a particular parameter, and may refer to JavaScript that references that same parameter. The decode, analysis, and re-encode module 424 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 402 along with an identifier for the particular client computer so that the system 402 may know which key or function to apply, and may otherwise maintain a state for the client computer and its session. A stateless approach may also be employed, whereby the system 402 encrypts the state and stores it in a cookie that is saved at the relevant client computer, or in a hidden field such as a field on a form that is being presented to a user and for which the input to the form is being obfuscated in a polymorphic manner. The client computer may then pass that cookie data back when it passes the information that needs to be decoded back to its original status. With the cookie data, the system 402 may use a private key to decrypt the state information and use that state information in real-time to decode the information from the client computer. Such a stateless implementation may create benefits such as less management overhead for the server system 402 (e.g., for tracking state, for storing state, and for performing clean-up of stored state information as sessions time out or otherwise end) and as a result, higher overall throughput.

The decode, analysis, and re-encode module 404 and the security server system 402 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 424 may be adapted to apply different modifications to each instance of a common web resource, or common portion of a web resource, such that the web code that it is ultimately delivered to the client computers in response to each request for the common web resource includes different modifications.

In certain implementations, the analysis can happen a single time for a plurality of servings of the code in different recoded instances. For example, the analysis may identify a particular function name and all of the locations it occurs throughout the relevant code, and may create a map to each such occurrence in the code. Subsequently, when the web content is called to be served, the map can be consulted and random strings may be inserted in a coordinated matter across the code, though the generation of a new name each time for the function name and the replacement of that name into the code, will require much less computing cost than would full re-analysis of the content. Also, when a page is to be served, it can be analyzed to determine which portions, if any, have changed since the last analysis, and subsequent analysis may be performed only on the portions of the code that have changed. Where the content is recoded at multiple levels in a network, the first change may occur, and then a second change can be applied to the first-changed code. The algorithms for transcoding the code may be established so that, if they are run on the code sequentially, the code will still interoperate in the manner that it would have interoperated as it was originally served. In other words, changes made at one level will not confuse a device at another level into making changes that will appreciably affected the operation of the code.

Even where different modifications are applied in responding to multiple requests for a common web resource, the security server system 402 can apply the modifications in a manner that does not substantially affect a way that the user interacts with the resource, regardless of the different transformations applied. For example, when two different client computers request a common web page, the security server system 402 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 426 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 402 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 402, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 404a-404n, as encoded by decode, analysis, and re-encode module 424, may be rendered on web browsers of various client computers. Uninfected client computers 412a-412n represent computers that do not have malicious code programmed to interfere with a particular site a user visits or to otherwise perform malicious activity. Infected client computers 414a-414n represent computers that do have malware or malicious code (418a-418n, respectively) programmed to interfere with a particular site a user visits or to otherwise perform malicious activity. In certain implementations, the client computers 412a-412n, 414a-414n may also store the encrypted cookies discussed above and pass such cookies back through the network 410. The client computers 412a-212n, 414a-414n will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 412a-412n, 414a-414n. For small-scale analysis, each web site operator may be provided with a single security console 407 that provides analytical tools for a single site or group of sites. For example, the console 407 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 407 may also be multiple different consoles used by different employees of an operator of the system 400, and may be used for pre-analysis of web content before it is served, as part of determining how best to apply polymorphic transformations to the web code. For example, in combined manual and automatic analysis like that described above, an operator at console 407 may form or apply rules 422 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions. Also, different organizations may have their own consoles at different levels of a network, and each such organization may receive reports relating to the execution of code that passed through their respective portions of the network, and they may be equipped with software that analyzes such reported data. For example, in a corporation, all devices may be mapped to physical locations, a security report may include an ID for a particular device, and an application may be run that automatically applies the ID to a mapping sub-application that reports through text and/or graphics where the device is physically located.

A central security console 408 may connect to a large number of web content providers, and may be run, for example, by an organization that provides the software for operating the security server systems 402a-402n. Such console 408 may access complex analytical and data analysis tools, such as tools that identify clustering of abnormal activities across thousands of client computers and sessions, so that an operator of the console 408 can focus on those clusters in order to diagnose them as malicious or benign, and then take steps to thwart any malicious activity.

In certain other implementations, the console 408 may have access to software for analyzing telemetry data received from a very large number of client computers that execute instrumentation code provided by the system 400. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 408 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 400, may be blocked from interaction, or may have their operators notified that their computer is potentially running malicious software (e.g., by sending an e-mail to an account holder of a computer so that the malicious software cannot intercept it easily).

Figure 5:
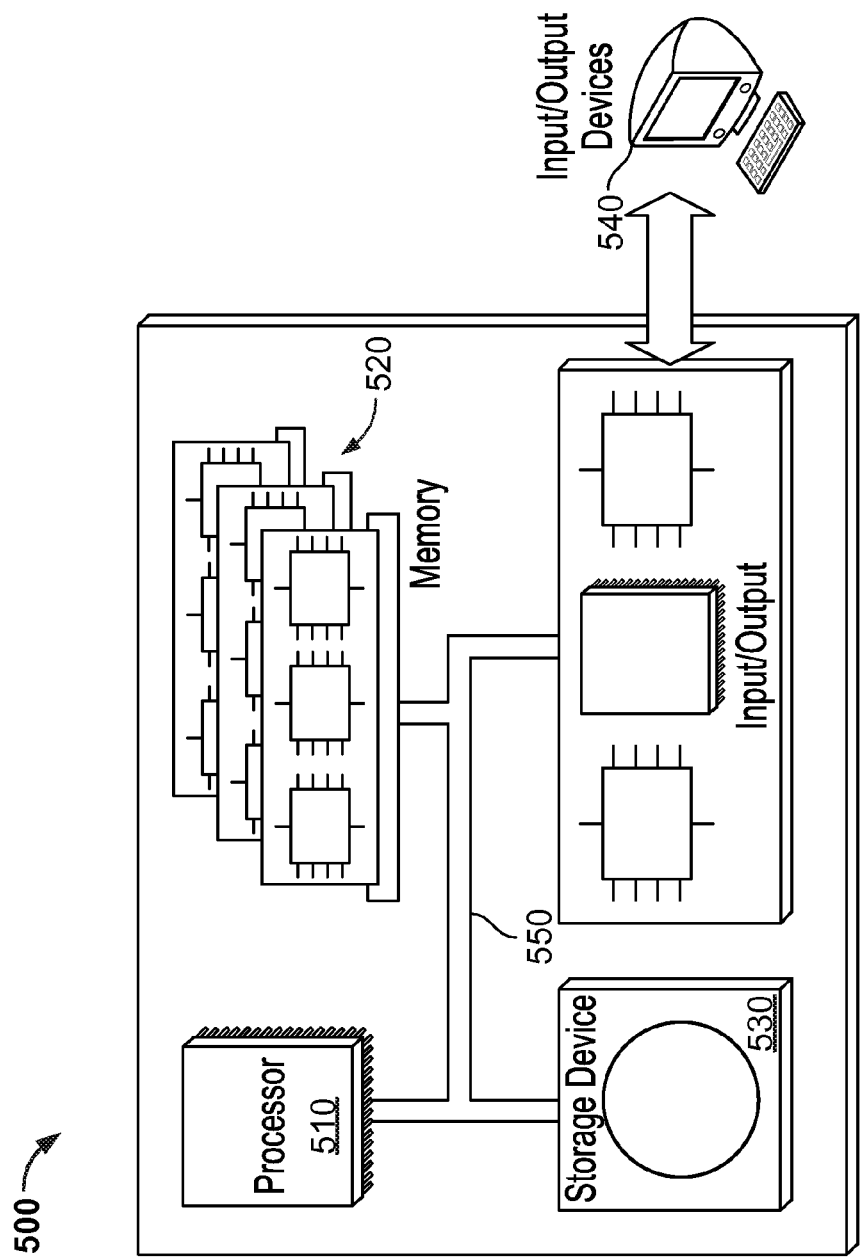
FIG. 5 shows an example computer system.

FIG. 5 shows an example of a computer system 500. The system 500 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method, comprising:
 receiving, at a computer security server system located between the Internet and a client computing device that makes requests over the Internet;
 code from a particular server system that is served in response to a request from the client computing device;

applying a security countermeasure to the received code to create transformed code;

providing the transformed code to the client computing device;

receiving a communication from the client computing device, the communication including content generated as a result of bot activity on the client computing device and that indicates bot attempts to interact with the received code rather than the transformed code; and applying transcoding to the content of the received communication that includes content generated as a result of bot activity to transcode the content of the received communication so that entities on the Internet side of the computer security server system receive a transcoded version of the content.

2. The computer-implemented method of claim 1, further comprising providing the received code in response to a plurality of different requests for content, wherein transformed code provided for each particular one of the different requests differs from the transformed code provided for each other one of the different requests.

3. The computer-implemented method of claim 1, further comprising, in response to determining that software on the client computing device has attempted to interact with the received code rather than the transformed code, generating an alert notification to personnel who work for an entity that operates the computer security server system.

4. The computer-implemented method of claim 1, wherein the computer security server system has coverage within a corporate local area network.

5. The computer-implemented method of claim 1, wherein the computer security server system is operated by a commercial Internet service provider (ISP) in serving content to subscribers of the commercial ISP.

6. The computer-implemented method of claim 5, further comprising reporting, from the ISP to a central security provider, information about the client computing device.

7. The computer-implemented method of claim 1, wherein the code received from the particular content server system has previously had countermeasures applied to it, by a security system located between the particular content server system and the Internet, that have transformed latent portions of the content that are not visible to a user of the client computing device using techniques that match countermeasures applied by the computer security server system.

8. The computer-implemented method of claim 7, wherein the countermeasures comprise applying polymorphic re-coding of the content, wherein the re-coding differs for each of multiple different servings of the content.

9. The computer-implemented method of claim 1, wherein the content transcoder is programmed to apply different transformations to the code received from the remote server systems in response to different requests for the same content.

10. A computer-implemented system, comprising:

a first electronic interface arranged to communicate with a plurality of client computing devices through a private network;

a second electronic interface arranged to communicate with remote server systems through the Internet;

a content transcoder, executable on one or more processors of the system, arranged to (a) apply one or more security countermeasures to code served from the remote server systems to the plurality of client computing devices and (b) reverse transcode content received from the client computing devices that includes content generated as a result of bot activity on the client computing devices, so that content that was previously transcoded when served by the system is made understandable to a remote server systems that provided the content, and content that was not previously transcoded is obscured to remote server systems; and a client monitor subsystem arranged to receive reports from instrumentation code executing on the client computing devices and added by the content transcoder to the code served by the remote server systems, and to generate notifications when the instrumentation code indicates anomalous activity on one of the client computing devices.

11. The computer-implemented system of claim 10, wherein the system is arranged to provide notifications generated by instrumentation code that is served with content to the client computing devices by the system to monitor third-party application interaction with the served content, to an information technology administrator, the notifications indicating particular ones of the client computing devices that are exhibiting anomalous behavior.

12. The computer-implemented system of claim 11, wherein the notification is provided in response to determining that software on a particular client computing device has attempted to interact with code received from one of the remote server systems rather than code created by the content transcoder.

13. The computer-implemented system of claim 10, wherein the system is operated within a corporate local area network.

14. The computer-implemented system of claim 10, wherein the system is operated by a commercial Internet service provider (ISP) in serving content to subscribers of the commercial ISP.

15. The computer-implemented system of claim 14, further comprising a client monitor subsystem that is arranged to report, from the ISP to a central security provider, information about client computing devices that cause generation of notifications, wherein the notifications are generated by instrumentation code that is served to the client computing devices by the system and that reports notifications in response to determining that code on the client computing devices and not served by the system has attempted to interact with code served by the system.

16. The computer-implemented system of claim 10, further comprising a second system located between one of the remote server systems and the Internet, and having a second content transcoder programmed to apply countermeasures that match countermeasures applied by the content transcoder, so that the countermeasures applied by the content transcoder become layered over the countermeasures applied by the second content transcoder.

17. The computer-implemented system of claim 16, wherein the countermeasures comprise applying polymorphic re-coding of the content, wherein the re-coding differs for each of multiple different servings of the content.

18. One or more non-transitory computer-readable media having instructions stored thereon that, when executed by one or more processors, cause performance of operations comprising:

receiving, at a computer security server system located between the Internet and a client computing device that makes requests over the Internet code from a particular server system that is served in response to a request from the client computing device;

applying a security countermeasure to the received code to create transformed code;

providing the transformed code to the client computing device;

receiving a communication from the client computing device, the communication including content generated as a result of bot activity on the client computing device and that indicates bot attempts to interact with the received code rather than the transformed code; and
applying transcoding to the content of the received communication that includes content generated as a result of bot activity to transcode the content of the received communication so that entities on the Internet side of the computer security server system receive a transcoded version of the content.

* * * * *